United States Patent [19]
Otsuka et al.

[11] Patent Number: 5,064,039
[45] Date of Patent: Nov. 12, 1991

[54] AUTOMATIC TRANSMISSION WITH SENSOR FAULT DETECTOR

[75] Inventors: Masuhiro Otsuka; Hiromi Kono; Yuji Satoh; Hiroyuki Soda, all of Saitama, Japan

[73] Assignee: Zexel Corporation, Tokyo, Japan

[21] Appl. No.: 649,412

[22] Filed: Feb. 1, 1991

[30] Foreign Application Priority Data

Feb. 6, 1990 [JP] Japan .................. 2-26316
Feb. 8, 1990 [JP] Japan .................. 2-28906

[51] Int. Cl.⁵ .............................. B60K 41/28
[52] U.S. Cl. .................. 192/0.052; 192/0.092; 192/3.63
[58] Field of Search ............... 192/0.052, 0.092, 3.63

[56] References Cited

U.S. PATENT DOCUMENTS

| | | | |
|---|---|---|---|
| 4,475,637 | 10/1984 | Oguma et al. | 192/0.054 |
| 4,569,255 | 2/1986 | Holmes | 192/0.092 X |
| 4,648,290 | 3/1987 | Dunkley et al. | 192/0.092 X |
| 4,653,621 | 3/1987 | Oshiage | 192/0.092 X |
| 4,714,145 | 12/1987 | Kurihara | 192/0.052 |
| 4,765,450 | 8/1988 | Kurihara | 192/0.052 |
| 4,965,730 | 10/1990 | Kurihara | 192/0.052 X |

Primary Examiner—Allan D. Herrmann
Assistant Examiner—Nicholas Whitelaw
Attorney, Agent, or Firm—Kanesaka & Takeuchi

[57] ABSTRACT

An automatic transmission with an engine rpm sensor fault detector includes a starter switch (18); a clutch (6) for transmitting an output of an engine (8); a clutch control unit for controlling engagement of the clutch; a transmission (1); an engine rpm sensor (9); a an input shaft sensor (5a); a gear position sensor (40a) for detecting a gear position of the transmission; a control unit (4) for controlling the clutch control unit based on outputs of the respective detectors and enables the starter switch to operate when the transmission is in a neutral position. The control unit includes a starter switch detector (40b) for determining whether the starter switch is on and a fault determination unit (40c) for determining whether the first detector is faulty. The fault determination unit controls the clutch control unit to engage the clutch temporarily if there is no output from the first detector with the starter switch on and determines that the first detector is faulty if there is an output from the second detector.

8 Claims, 10 Drawing Sheets

FIG. 3 ERROR CHECK ROUTINE

FAULT DETECTION DURING LEARNING PERIOD

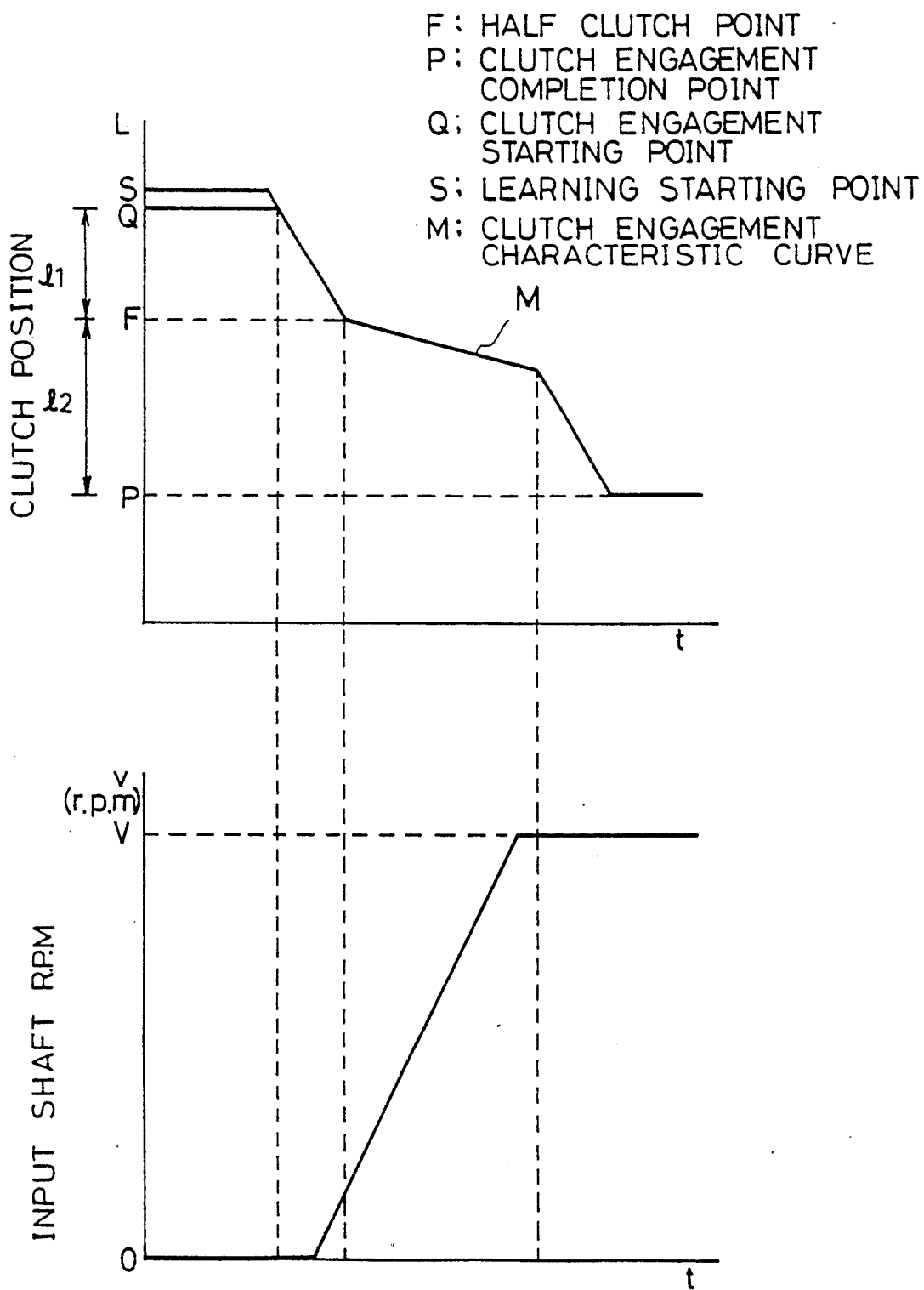

AUTOMATIC TRANSMISSION WITH SENSOR FAULT DETECTOR

BACKGROUND OF THE INVENTION

1. Field of the Invention

The present invention relates generally to automatic transmissions and clutch control units for vehicles and, more particularly, to an automatic transmission with a sensor fault detector able to detect a fault of a sensor which detects the rpm of an engine.

2. Description of the Prior Art

FIG. 9 shows a conventional an automatic transmission including a clutch control unit. A well known parallel axis gear type transmission 1 is controlled by a transmission actuator 2 composed of a select actuator 2a and a shift actuator 2b. These actuators 2a and 2b are driven by a hydraulic drive unit 3 which consists of a tank 3a, a pump 3b, an accumulator 3c, and a hydraulic pressure switching electromagnetic valve (not shown) to control the driving gear of the transmission 1 via a pair of piston rods 2c and 2d. This control is made possible by the central processing unit (CPU) of a transmission drive unit 2e. The drive unit 2e is controlled through serial communications by a main control unit 4 which has a CPU, a read only memory (ROM), and a random access memory (RAM). A pair of potentiometers 2f and 2g sense the positions of the piston rods 2c and 2d. The position signals from the potentiometers 2f and 2g are fed back to the drive unit 2e to control the gear position so that the position signals match the target signals from the main control unit 4. An input shaft sensor 5a senses the rpm v of an input shaft 1a of the transmission. A vehicle speed sensor 5b senses the vehicle speed or rpm V' of an output shaft 1b of the transmission 1. The outputs of these sensors 5a and 5b are fed to the main control unit 4.

A clutch 6 is interlocked with the piston rod 7a of a clutch actuator 7 for control. The hydraulic pressure is supplied to the clutch actuator 7 from the drive unit 3, and the clutch 6 is feedback controlled by the CPU of a clutch drive unit 7b so that the position of the piston rod 7a which is sensed by a potentiometer 7c matches the target signal from the main control unit 4. The clutch actuator 7 and the clutch drive unit 7b constitute a clutch control unit 70. The clutch drive unit 7b is controlled by the main control unit 4 through serial communications.

An engine 8 has a control unit 8a which is controlled by the main control unit 4. An engine rpm sensor 9 senses the rpm V of an output shaft 8b of the engine 8. The revolutions of the engine 8 are transmitted to an axle 10 via the clutch 6 and the transmission 1. The output of the engine rpm sensor 9 is fed to the main control unit 4 for performing various controls such as a fuel supply control. More signals are fed to the main control unit 4 from an accelerator pedal sensor 11, a brake pedal sensor 12, an exhaust brake switch 14, and a selector 15 to control the transmission drive unit 2e, the clutch drive unit 7b, the engine control unit 8a, a display panel unit 16, and a control unit 17a for controlling a gear position display panel 17. Consequently, the main control unit 4 controls the clutch 6 and the transmission 1 according to the amount of depression of the accelerator pedal, the outputs of the respective sensors, and the positions of the selector 15 and gears of the transmission 1. The gear position is controlled by the select actuator 2a and the shift actuator 2b according to the set position of the selector 15. When the selector 15 is set in the position "1", "2", "3", or "R", the gear is controlled into the first, second, third, or reverse gear position. When the selector 15 is set in the automatic transmission position "D4" or "D5", the gear is controlled automatically from the first to the fourth gear position or from the second to the fifth gear position according to the gear transmission map based on the amount of depression of the accelerator pedal and the vehicle speed.

Upon the above transmission control, the clutch 6 is automatically disengaged and then engaged by the main control unit 4 via the clutch actuator 7 and the clutch drive unit 7b. This control is made according to the clutch engagement characteristics obtained from learning activities made under predetermined conditions. Such learning activities are shown in FIG. 10. A learning starting point S is stored in the memory of the main control unit 4. When preconditions under which the engine is revolving, the gear is set in the neutral, and the vehicle is at rest, are satisfied, the clutch 6 is moved toward engagement from the learning starting point S to determine, as a learning point, a half clutch point F from the rpm v of the input shaft sensor 5a. Then, an engagement starting point Q and an engagement completion point P are determined by taking predetermined offset distances $l_1$ and $l_2$ toward disengagement and engagement from the half clutch point F, thereby making a clutch engagement characteristic curve which includes the half clutch point F, the clutch engagement completion point P, and the engagement starting point Q. The clutch engagement characteristic curve M is stored in the memory. In the next learning activity, the above engagement starting point Q is taken as a learning starting point S to perform a similar learning activity. By controlling the clutch 6 according to the clutch engagement characteristic curve thus obtained, it is possible to minimize the movement of the clutch 6, thereby not only speeding up the gear shift but also reducing the wear and tear of the clutch 6.

While only the half clutch point is determined by learning in the above example, two points; the engagement completion point and the engagement starting point may be determined by learning as described in Japanese Patent Application Kokai No. 60-34525.

In FIG. 9, a starter switch 18 is connected at one end to a battery and at the other end to a starter relay 19 which consists of a relay coil 19a and a relay contact 19b. The relay coil 19a is connected to the main control unit 4 via a starter drive line 19c which is turned on under predetermined conditions. The relay 19b is connected to a starter motor 20 for starting the engine 8. The juncture between the starter switch 18 and the starter relay 19 is connected to the main control unit 4 via a starter signal line 19d. An emergency switch 21 permits the starter to start unconditionally in the case of an emergency such as an engine failure on a railroad crossing.

The main control unit 4 not only controls the clutch 6 and the transmission 1 based on various input signals but also turns on the starter drive line 19c (L level) to enable the starter switch 18 to operate when the transmission 1 is in the neutral position. Japanese Patent Applications Kokoku No. 61-57576 and Kokai No. 59-213936 disclose that if there is no output from the engine rpm sensor, with the starter switch turned on, it is determined that the sensor is faulty, and the necessary backup operation is performed.

As has been described above, conventionally, when there is no output from the engine rpm sensor with the starter switch turned on, it is determined that the sensor is faulty. However, there can be other causes, such as a breakdown of the starter drive line or starter motor or a dead battery, that disable the engine to start. The conventional units are unable to detect such disabling causes.

Also, because of electrically unstable conditions caused at the time of start of the starter motor, the control unit can make an incorrect determination that the engine rpm sensor is faulty.

SUMMARY OF THE INVENTION

Accordingly, it is an object of the invention to provide an automatic transmission with a sensor fault detector able to detect a fault of an engine rpm sensor accurately.

It is another object of the invention to provide an automatic transmission with a sensor fault detector able to detect a fault of an engine rpm sensor accurately and quickly.

It is still another object of the invention to provide an automatic transmission with a sensor fault detector able to detect a fault of an engine rpm sensor accurately by disabling such fault detection when the electrical system is unstable at the time of start of the starter.

According to an aspect of the invention there is provided an automatic transmission with a sensor fault detector which includes a starter switch; a clutch for transmitting an output of an engine; a clutch control unit for controlling engagement of the clutch; a transmission; a first detector for detecting an rpm of the engine; a second detector for detecting an output rpm of the clutch; a gear position detector for detecting a gear position of the transmission; a control unit for controlling the clutch control unit based on outputs of the respective detectors and enables the starter switch to operate when the transmission is in a neutral position; the control unit including a starter switch-on determination unit for determining whether the starter switch is on and a fault determination unit for determining whether the first detector is faulty; the fault determination unit controlling the clutch control unit to engage the clutch temporarily if there is no output the said first detector with the starter switch on and determines that the first detector is faulty if there is an output from the second detector.

According to another aspect of the invention there is provided an automatic transmission with a sensor fault detector, which includes a starter switch; a clutch for transmitting an output of an engine; a clutch control unit for controlling engagement of the clutch; a transmission; a first detector for detecting an rpm of the engine; a second detector for detecting an output rpm of the clutch; a gear position detector for detecting a gear position of the transmission; a control unit for controlling the clutch control unit based on outputs of the respective detectors and enables the starter switch to operate when the transmission is in a neutral position; the control unit including a starter switch-on determination unit for determining whether the starter switch is on and a fault determination unit for determining whether the first detector is faulty; the fault determination unit controlling the clutch control unit to engage the clutch in advance and determines that the first detector is faulty if there is no output from the first detector but an output from the second detector when the starter switch is on.

According to still another aspect of the invention there is provided a clutch control system with a sensor fault detector, which includes a clutch; a clutch control unit for controlling engagement of the clutch; a first detector for detecting an rpm of an engine; a second detector for detecting an output rpm of the clutch; a vehicle condition detector for detecting a condition of a vehicle; a clutch learning unit for moving the clutch toward engagement from a predetermined learning starting point by means of the clutch control unit when the vehicle condition detector indicates that the vehicle is in a predetermined state, determines a clutch position where an output of the clutch reaches a predetermined rpm, and controls the clutch control unit based on the clutch position; a learning determination unit for determining whether the clutch learning unit is in a learning activity and a fault determination unit for determining that the first detector is faulty if there is no output from the first detector but an output from second detector when the clutch learning unit is in a learning activity or when a vehicle starts to move.

The above and other objects, features, and advantages of the invention will become more apparent from the following description when taken in conjunction with the accompanying drawings.

BRIEF DESCRIPTION OF THE DRAWINGS

FIG. 10 is a graph showing the clutch engaging characteristic curves.

DESCRIPTION OF THE PREFERRED EMBODIMENT

Figure 1:
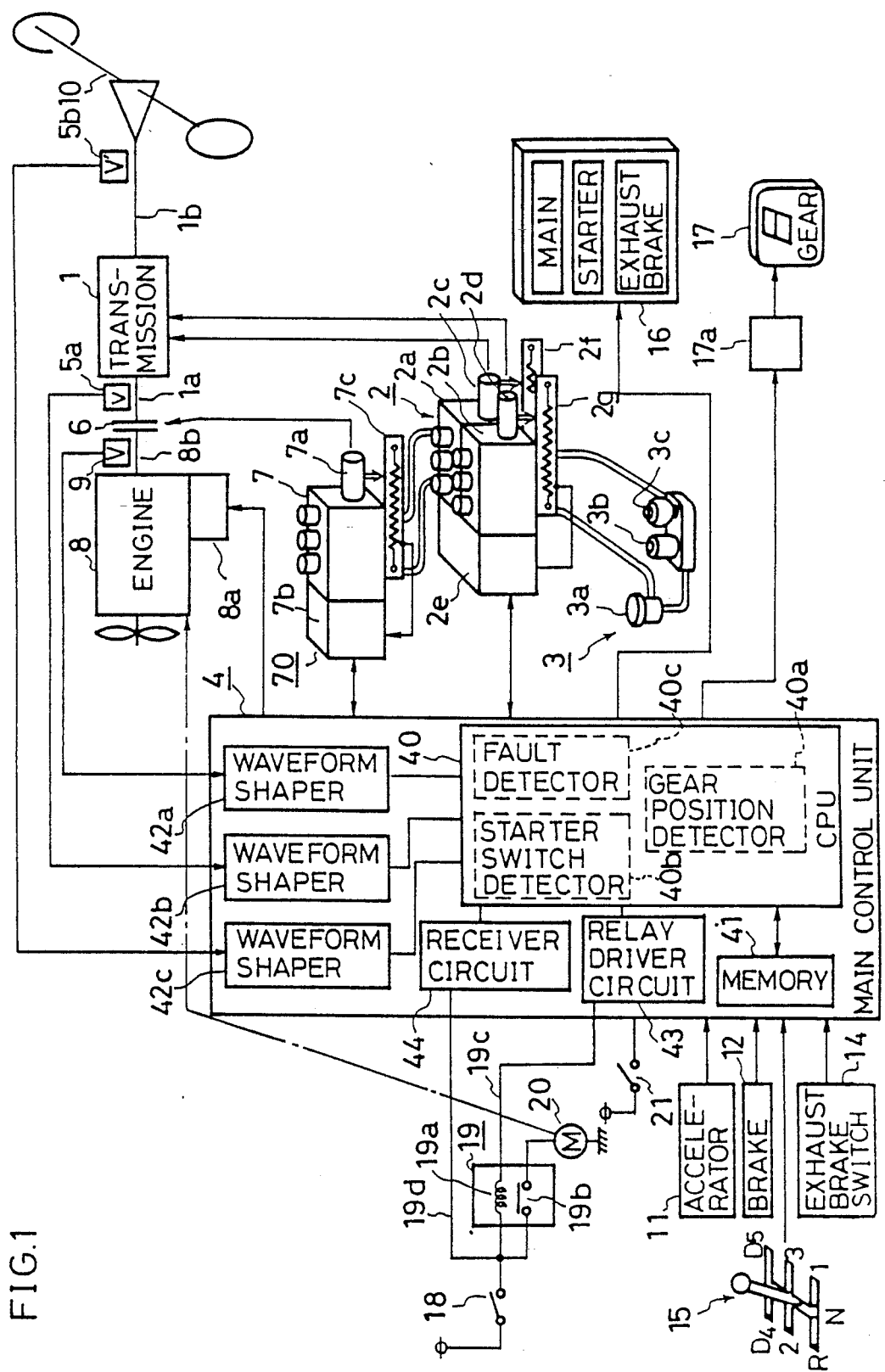
FIG. 1 is a block diagram of a block diagram of an automatic transmission with a sensor fault detector according to an embodiment of the invention.
Figure 9:
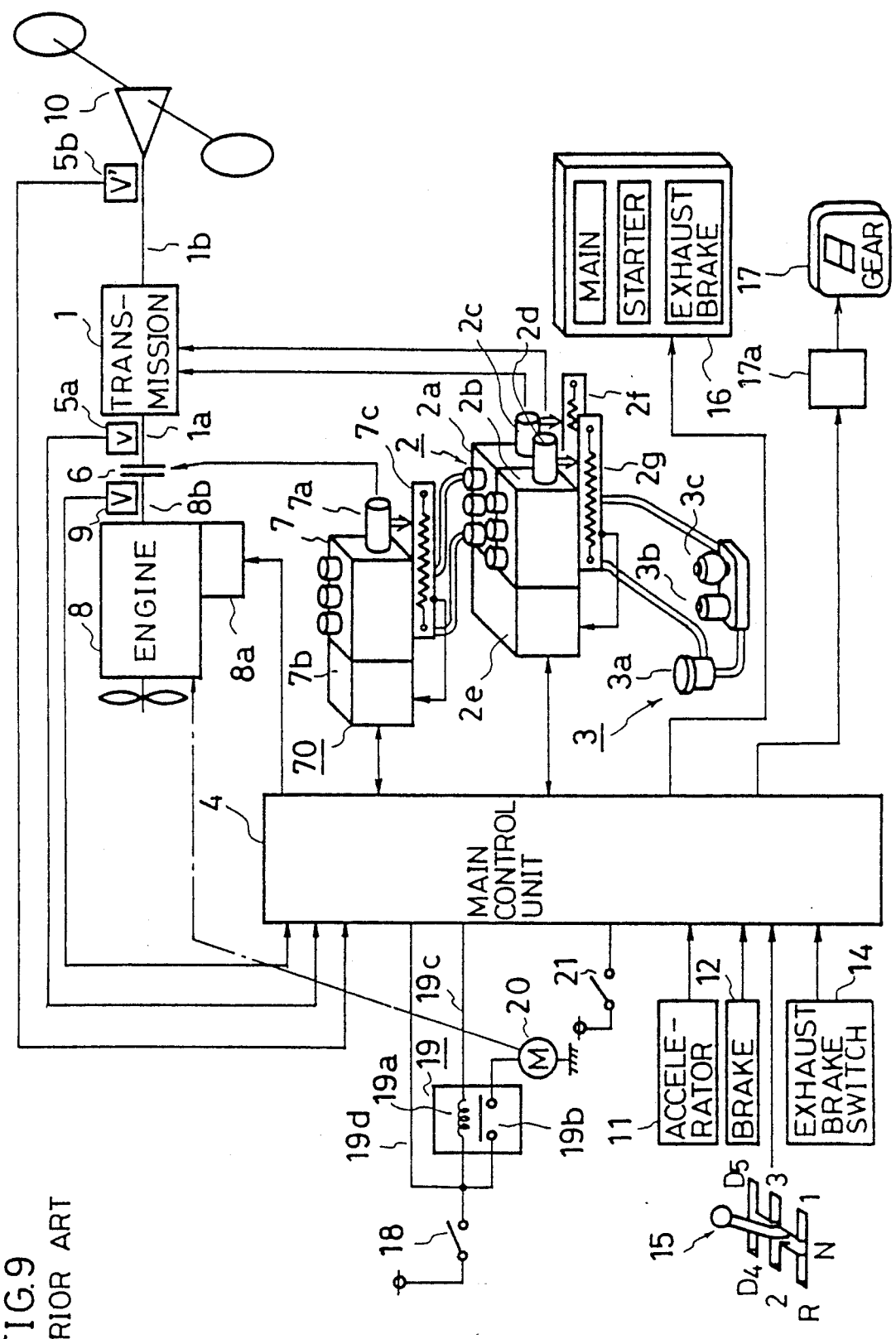
FIG. 9 is a block diagram of a conventional automatic transmission.

FIG. 1 shows an automatic transmission with a sensor fault detector according to an embodiment of the invention. Like reference characters designate like or corresponding parts in FIG. 9. A memory 41 consists of a ROM and a RAM for storing programs and data used by the CPU 40 of a main control unit 4. The outputs of the engine rpm sensor 9, the input shaft sensor 5a, and the vehicle speed sensor 5b are fed to the CPU 40 via waveform shapers 42a–42c. The starter drive and signal lines 19c and 19d are connected to the CPU 40 via a relay driver circuit 43 and a receiver circuit 44, respectively. A gear position detector 40a determines whether the gear is set in the neutral based on a select signal from the selector 15 and whether the current gear position of the transmission 1 is neutral based on the current position signals from the respective potentiometers 2f and 2g via the transmission drive unit 2e. A starter switch detector 40b determines whether the starter drive line 19c is on when the starter switch 18 is turned on. Where there is no output from the engine rpm sensor 9 with the starter switch 18 turned on, a fault detector 40c determines that the engine rpm sensor 9 is fault if there is an output from the input shaft sensor 5a when the clutch 6 is connected temporarily by controlling the clutch control unit 70 which consists of the clutch drive unit 7b and the clutch actuator 7.

Figure 2:
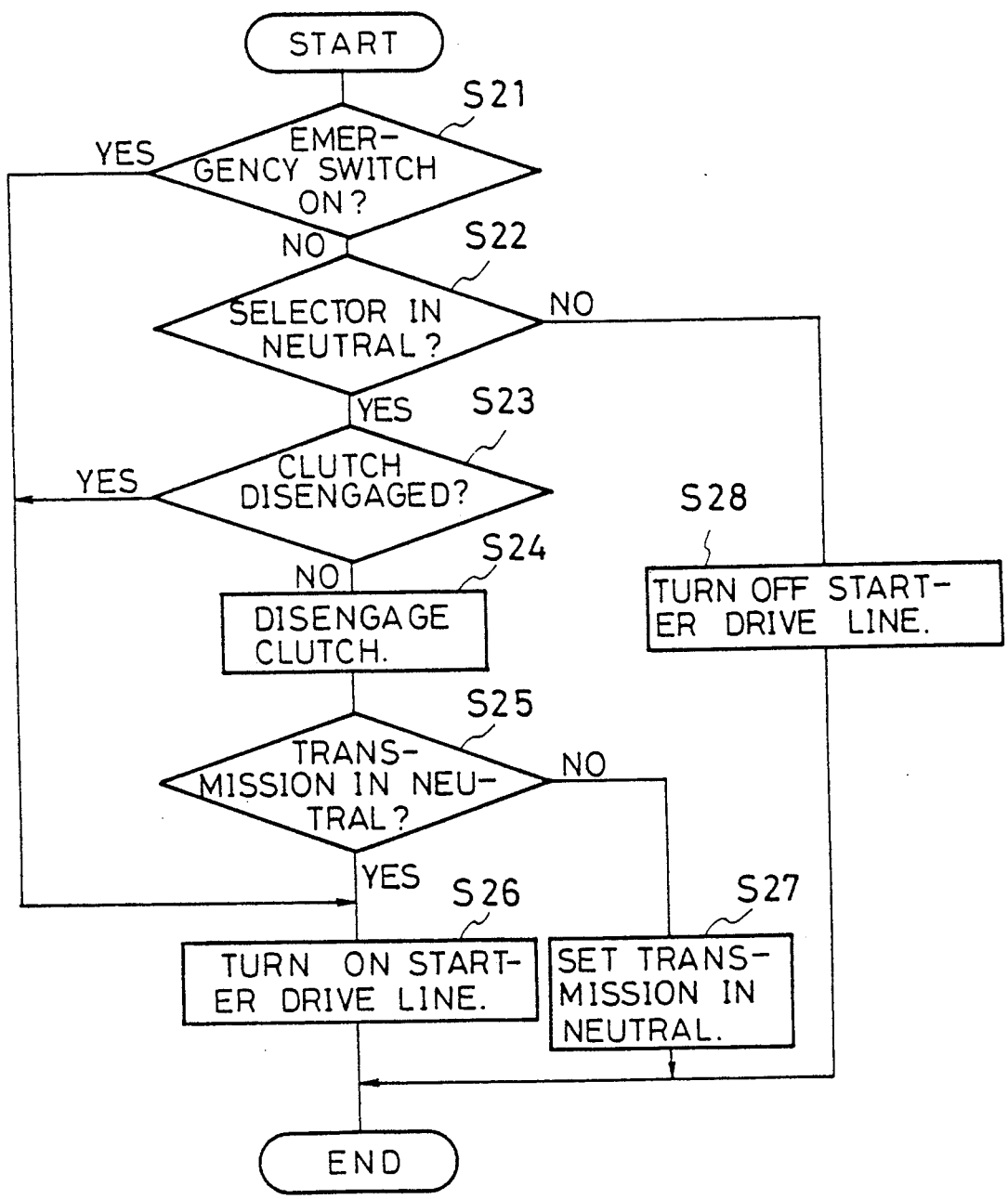
FIG. 2 is a flowchart of a starter control routine for the automatic transmission of FIG. 1.

FIG. 2 shows how a starter control routine is carried out. First of all, it is determined whether the emergency switch 21 is on (Step S21). If it is on, control is transferred to Step S26, wherein the starter drive line 19c is turned on (L level) via the relay driver circuit 43, thereby enabling the starter switch 18 to operate. This makes it possible to get out quickly of a railway crossing, for example, in the case of an engine failure. If the emergency switch 21 is not on, on the other hand, it is determined whether the selector 15 is in the neutral (Step S22). If it is in the neutral, it is determined whether the clutch 6 is disengaged (Step S23). If it is disengaged, control is transferred to Step S26 to turn on the starter drive line 19c. If the clutch 6 is not disengaged in the step S23, the clutch 6 is disengaged (Step S24). Then, it is determined whether the transmission 1 is in the neutral (Step S25). If it is, the starter drive line 19c is turned on (Step S26). If it is not, control is transferred to Step S27 to set the transmission 1 in the neutral. If the selector 15 is not in the neutral in the step S22, control is transferred to Step S28 to turn off the starter drive line 19c.

Figure 3:
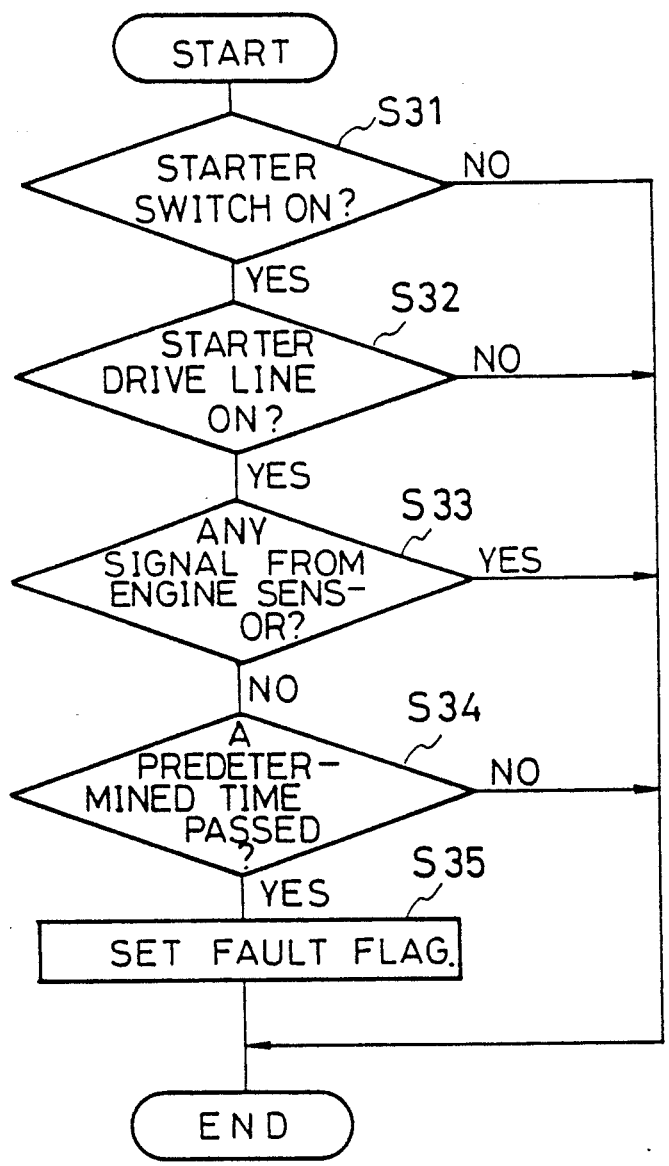
FIG. 3 is a flowchart of a fault check routine for the automatic transmission of FIG. 1.

FIG. 3 shows how an error check routine is carried out. In Step S31, it is determined whether the starter switch 18 is on. If it is, it is determined whether the starter drive line 19c is on in Step S32. If it is, it is determined whether there is any signal from the engine rpm sensor 9 in Step S33. If there is one, it is determined that there is no trouble, and the routine is terminated. If there is no signal in the Step S33, on the other hand, it is determined whether a predetermined period of time has passed since the starter switch 18 is turned on (Step S34). If it has, a fault flag is set in the RAM area of the memory 41 (Step S35).

Figure 4:
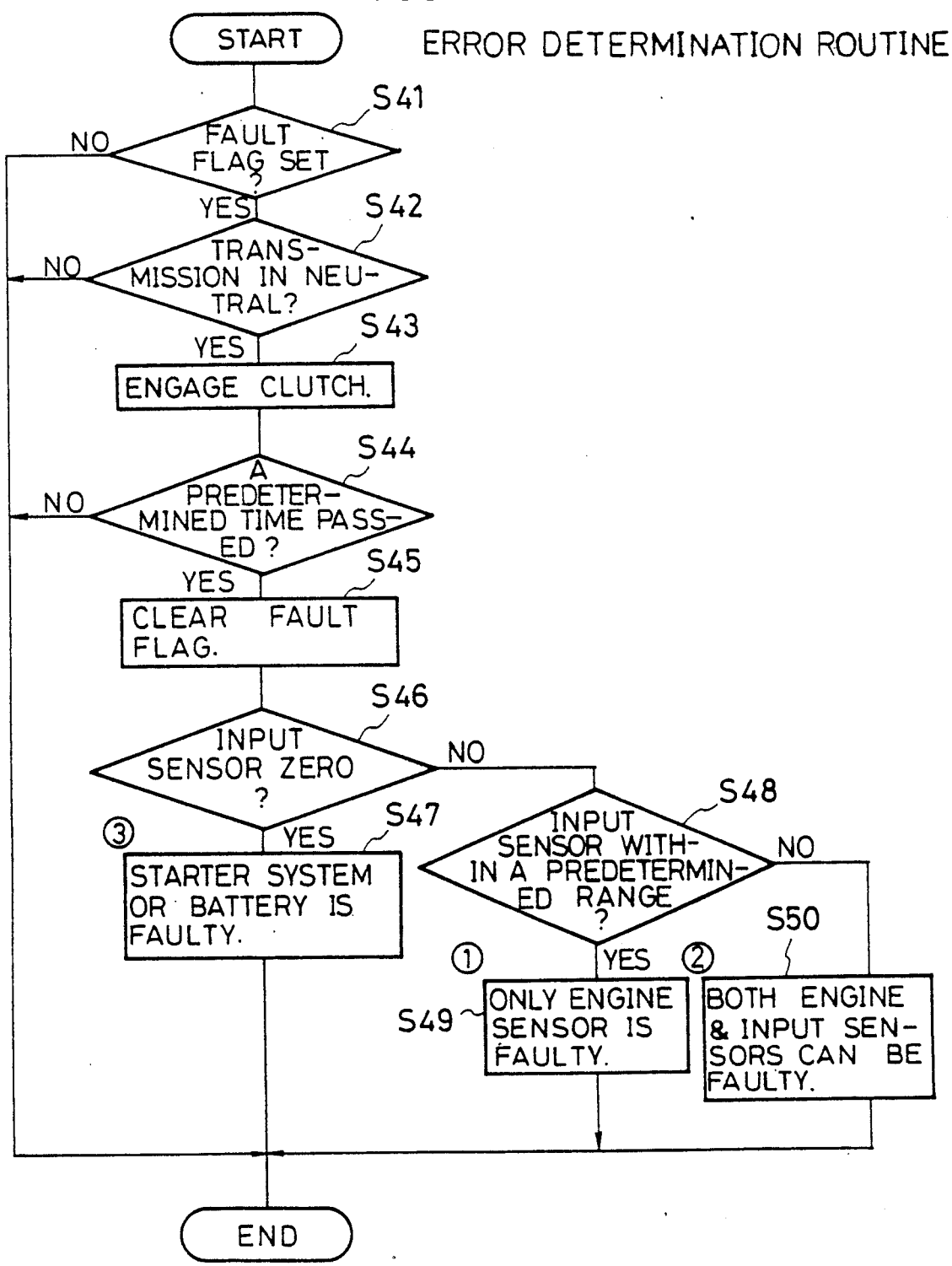
FIG. 4 is a flowchart of a fault determination routine for the automatic transmission of FIG. 1.

FIG. 4 shows an error determination routine. First of all, it is determined whether the above fault flag is set (Step S41). If it is, it is determined whether the transmission 1 is in the neutral (Step S42). If it is, the clutch 6 is engaged temporarily (Step S43), and it is determined whether a predetermined period of time has passed (Step S44). If it has passed, the fault flag is cleared (Step S45), and it is determined whether there is an output from the input shaft sensor 5a (Step S46). If there is one, it is determined whether its value falls within a predetermined range (Step S48). If it does, it is determined that only the engine rpm sensor 9 is faulty (Step S49). If it does not, it is determined that both of the engine rpm sensor 9 and the input shaft sensor 5a can be faulty (Step S50). If there is no output from the input shaft sensor 5a in the above step S46, it is determined that either the starter system or the battery is faulty. If a fault is detected, the driver is informed of the fault with an indicator such as a lamp, and the backup operation necessary for the fault is performed at a point (1), (2), or (3). By dividing faults into the above three faulty points or modes, it is assured that no inappropriate backup operation is performed.

According to another embodiment of the invention, the fault detector 40c functions differently from that of the above embodiment. That is, the fault detector 40c in this embodiment controls the clutch control unit 70 to engage the clutch 6 when the starter is driven and, then, determines that the engine rpm sensor 9 is faulty if there is no output from the engine rpm sensor 9 but an output from the input shaft sensor 5a when the starter switch 18 is turned on.

Figure 5:
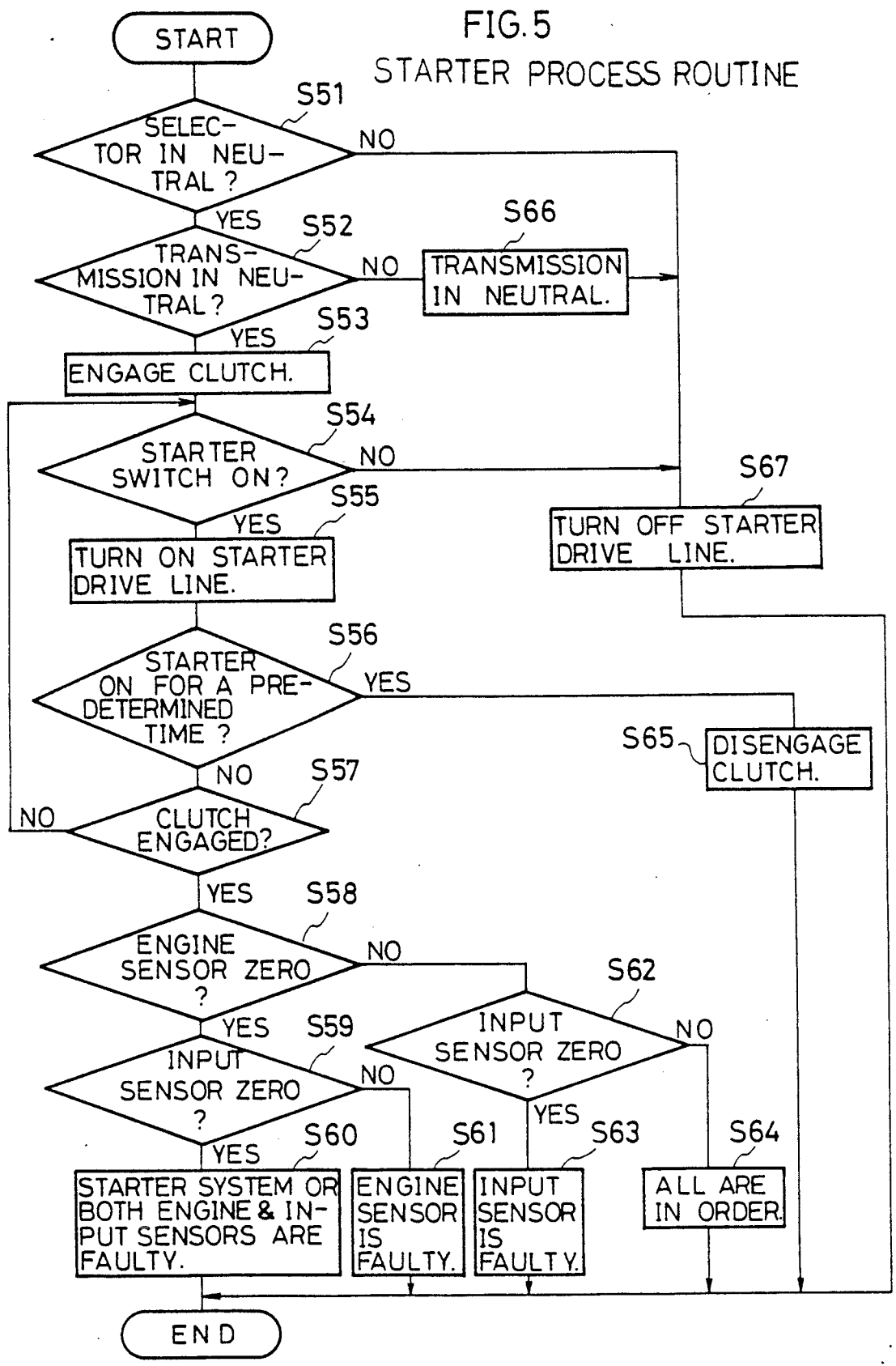
FIG. 5 is a starter process routine according to another embodiment of the invention.

FIG. 5 shows a starter process routine in this embodiment. When the starter is turned on, it is determined whether the selector 15 is in the neutral (Step S51). If it is, it is determined whether the transmission 1 is indeed in the neutral (Step S52). If it is, the clutch control unit 70 is controlled so as to engage the clutch 6 (Step S53). Then, it is determined whether the starter switch 18 is on (Step S54). If it is, the starter drive line 19c is turned on so as to turn on the starter relay 19 (Step S55). Then, it is determined whether the on state of the starter relay 19 lasts for a predetermined period of time (Step S56). If it does not, it is determined whether the clutch 6 has been engaged (Step S57). If it has not, control is transferred back to Step S54, while if it has, it is determined whether there is an output from the engine rpm sensor 9 (Step S58). If there is no output, it is determined whether there is an output from the input shaft sensor 5a in Step S59. If there is no output, it is determined that either the starter system (including the battery) or both of the engine rpm sensor 9 and the input shaft sensor 5a are faulty in Step S60. If there is an output from the input shaft sensor 5a in the above step S59, it is determined in Step 61 that only the engine rpm sensor 9 is faulty. If there is an output from the engine rpm sensor 9 in the above step S58, it is determined whether there is an output from the input shaft sensor 5a in Step S62. If there is none, it is determined that the input shaft sensor 5a is faulty (Step S63). If there is one, it is determined that all are in good order (Step S64). If the predetermined period for fault determination passed since the starter relay is turned on in the above step S56, the clutch is disengaged in Step S65 to facilitate start of the engine. If the starter switch 18 is off in the above step S54, the transmission is shifted to the neutral in the above step S66, or the selector 15 is not in the neutral in the above step S61, the starter drive line 19c is turned off in Step S67.

As has been described above, since the outputs of the engine rpm sensor 9 and the input shaft sensor 5b are checked with the clutch 6 engaged when the starter is driven, the time for fault determination is so short that it is possible to take the appropriate backup action quickly. In the first embodiment, the clutch is engaged after the output of the engine rpm sensor is checked so that the fault detection is delayed by that much. By contrast, in this embodiment, it is possible to detect a fault of the engine rpm sensor 9 in the same period as in the conventional model, thereby assuring safe, backup running.

Figure 6:
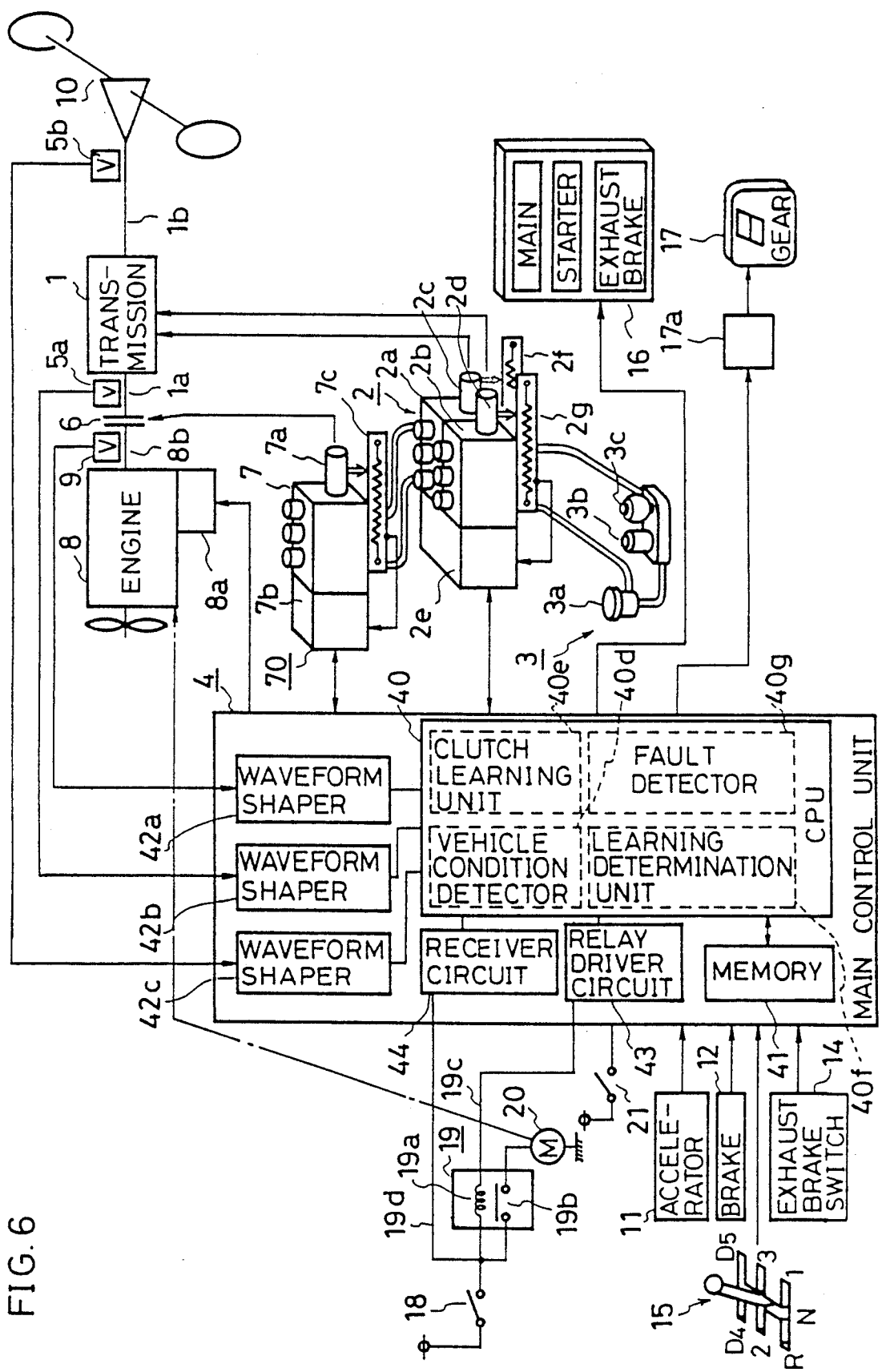
FIG. 6 is a block diagram of an automatic transmission with a sensor fault detector according to still another embodiment of the invention.

FIG. 6 shows an automatic transmission with a sensor fault detector according to still another embodiment of the invention, wherein like reference characters denote like or corresponding parts in FIG. 1. The CPU 40 includes a vehicle condition detector 40d, a clutch learning unit 40d, a learning determination unit 40e, and a fault determination unit 40g. The vehicle condition detector 40d detects the driving condition of the engine 8, the setting condition of the selector 15, and the conditions of the vehicle at rest or upon start based on various input signals. The clutch learning unit 40e determines the clutch position at which the output of the input shaft sensor 5a is no longer zero when the clutch 6 is moved toward engagement from the predetermined learning starting point via the clutch drive unit 7b when the vehicle is at rest with the selector 15 set in the neutral and control the clutch control unit 7b based on the learned clutch position. Also, it stores the clutch learning position in the memory 41 and sets or clears a flag F1 in the memory 41 depending whether the learning activity is completed. If the flag F1 is set, it means that the learning activity is completed while if the flag is cleared, it means that the learning activity is not completed. The learning determination unit 40f determines based on the flag F1 in the memory 41 whether the learning activity is in progress. The fault determination unit 40g determines that the engine rpm sensor 9 is faulty when there is no output from the engine rpm sensor 9 despite the presence of an output from the input shaft sensor 5a under a learning activity or upon start of the vehicle and sets or clears a flag F2 in the memory 41 depending whether the fault determination is completed in the learning activity. If the flag F2 is set, it means that the fault determination is not completed during the learning activity while if the flag is cleared, it means that the fault determination is completed. If the fault determination is not completed during the learning period, it is completed as the vehicle starts to move.

Figure 7:
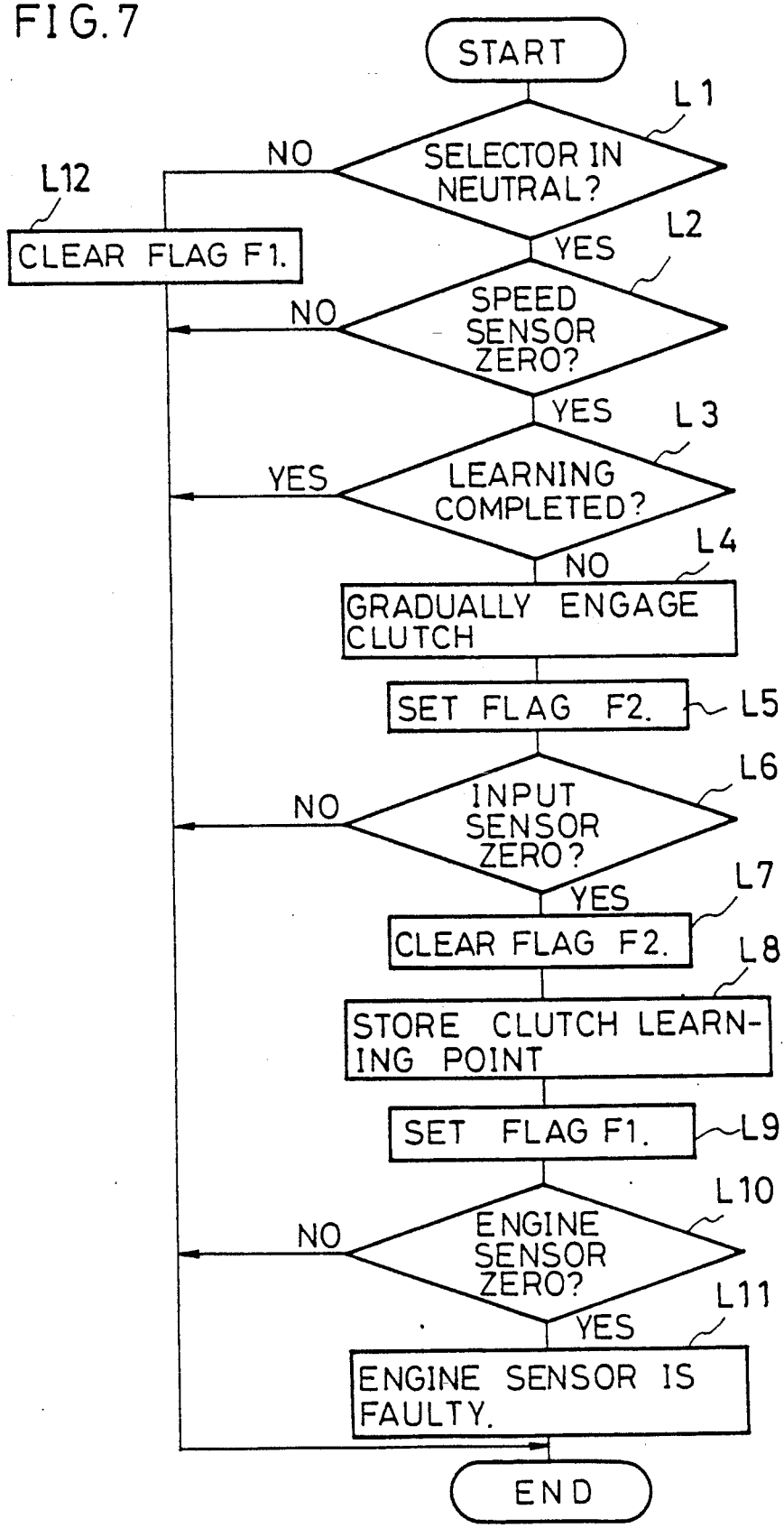
FIG. 7 is a flowchart of a fault detection in a learning period for the automatic transmission of FIG. 6.

FIG. 7 shows how the fault detection is made during the learning period. In Step L1, it is determined whether the selector 15 is in the neutral "N". If it is, it is determined whether the output of the vehicle speed sensor 5b is zero or the vehicle is at rest in Step L2. If it is, it is determined based on the flag F1 whether the learning activity is completed in Step L3. If it is not, the clutch 6 is engaged gradually so as to enter into a learning activity in Step L4. In Step L5, a flag F2 is set in anticipation that the fault determination is not completed during the learning period. In Step L6, it is determined whether the output of the input shaft sensor 5a is no longer zero. If it is not, indicating that the clutch 6 is engaged, the flag F2 is cleared in Step L7 because it is possible to make a fault determination. The clutch position is stored in the memory 41 as a clutch learning position in Step L8. In Step L9, a flag F1 is set to indicate that the learning activity is completed. In Step L10, it is determined whether the output of the engine rpm sensor 9 is zero. If it is not, it is determined that there is no fault. If it is; namely, there is no output from the engine rpm sensor 9 despite the presence of an output from the input shaft sensor 5a, it is determined that the engine rpm sensor 9 is faulty in Step L11.

The learning activity also detects a fault of the engine rpm sensor so that it is made even if the output of the engine rpm sensor is zero. If the selector 15 is not in the neutral in the above step L1, control is transferred to Step 12 to clear the flag F1 which indicates that the learning activity is completed and terminate the routine process. If the vehicle speed is not zero in the above step L2, the learning activity is completed in the step L3, the output of the input shaft sensor 5a is still zero in the step L6, or the output of the engine rpm sensor 9 is not zero in the step L10, the routine process is terminated and then started again from the step L1. If the selector 15 is shifted to the drive "D" from the neutral "N" and the accelerator pedal is depressed under the condition that the fault check is not completed, the clutch 6 is engaged to start the vehicle in the same way as in the ordinary control. If the vehicle does not start, it is determined that the engine rpm sensor is faulty.

Figure 8:
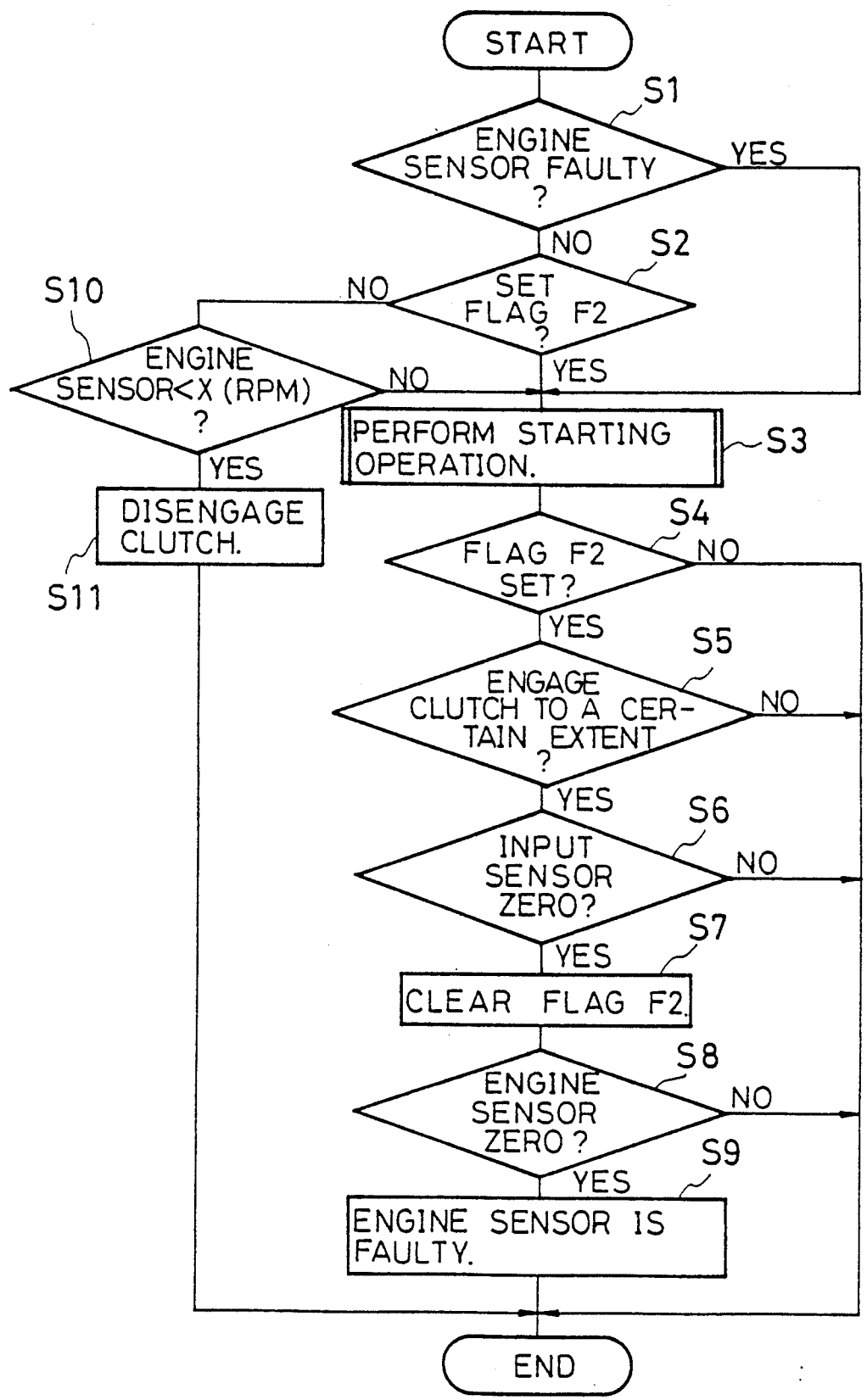
FIG. 8 is a flowchart of a fault detection at the time of start for the automatic transmission of FIG. 6.

FIG. 8 shows a fault detection at the time of start of the vehicle. In Step S1, it is determined whether the engine rpm sensor is faulty. If it is, control is transferred to Step S3 to perform a starting operation wherein the clutch 6 is engaged up to a point corresponding to the amount of depression of the accelerator pedal. If no fault is detected, it is determined whether a flag F2 is set in Step S2. If it is, or the fault determination is not completed during the learning period, the starting operation is performed in the step S3 although the engine 8 is at rest. In Step S4, it is determined whether the flag F2 is set. If it is not, or the fault determination is completed and control is jumped from the step S1 to the step S3 to complete the starting operation, the process is terminated because it is not necessary to do another fault determination. Since the fault determination is not completed when the flag F2 is set, it is determined whether the clutch 6 is engaged to a certain extent in Step S5. If it is, it is determined whether the output of the input shaft sensor 5a is zero in Step S6. If it is not, the fault determination is possible so that the flag F2 is cleared in Step S7. Then, it is determined whether the output of the engine rpm sensor 9 is zero in Step S8. If it is not, it is determined that there is no fault, and the process is terminated. If it is, it is determined that the engine rpm sensor 9 is faulty in Step S9. If the flag F2 is not set in the above step S2, the fault determination is completed, and the engine rpm sensor 9 is not faulty so that it is determined whether the output of the engine rpm sensor 9 reaches a predetermined value ×(300 rpm for example). If it does, control is transferred to the starting operation in the step S3, and the process is terminated via the step S4. If it does not, the clutch 6 is disengaged to prevent engine stop in Step S11, and the process is terminated. If the clutch 6 is not engaged in the step S5 or the output of the input shaft sensor 5a is zero in the step S6, the process is terminated.

As has been described above, according to this embodiment, no fault determination is made in the period when the electric system is unstable (the starter motor is driven) so that it is possible to prevent incorrect fault determination. Since the fault determination is not made based on only the output of the engine rpm sensor 9, it is possible to identify a fault of the engine rpm sensor 9 more accurately than before.

Since the fault determination is made when the clutch meet point is learned before start of the vehicle, it is very efficient. If the selector is shifted from the neutral to the drive with the fault determination uncompleted, the ordinary control is made to not only engage the clutch but also make fault determination, thereby assuring start of the vehicle and fault determination.

While it is determined whether the output of the input shaft sensor 5a is zero in the step S6 of FIG. 8, the vehicle speed sensor 5b may be used to detect the rpm of an output of the clutch for making fault determination since the selector 15 is switched so that the transmission 1 is shifted from the neutral to the drive at the starting time.

While only one point or the half clutch point is determined by learning activities in the above embodiments, substantially the same results may be obtained by determining two points; the clutch engagement completion point and the clutch engagement starting point as described in Japanese Patent Application Kokai No. 60-34525. Furthermore, while the invention has been described by way of the clutch control unit of an automatic transmission, it is noted that its application is not limited to automatic transmissions.

As has been described above, according to an aspect of the invention, when there is no output from the engine rpm sensor with the starter switch on, the clutch control unit is controlled so that the clutch is engaged temporarily. At this point, if there is an output from the clutch output rpm detector, it is determined that the engine rpm sensor is faulty so that it is possible to detect a fault of the engine rpm sensor accurately.

In accordance with another aspect of the invention, if there is no output from the engine rpm sensor and there is an output from the clutch output rpm sensor when the clutch control unit is controlled to engage the clutch and the starter switch is turned on, it is determined that the engine rpm sensor is faulty so that it is possible to detect a fault of the engine rpm sensor accurately and quickly.

In accordance with still another aspect of the invention, if there is an output from the clutch output rpm sensor but no output from the engine rpm sensor during the clutch learning activity or upon start of the vehicle, it is determined that the engine rpm sensor is faulty. Thus, no fault determination is made in the period when the starter motor is driven and the electric system is unstable so that it is possible to detect a fault of the engine rpm sensor more accurately than before.

We claim:

1. An automatic transmission with a sensor fault detector, comprising:
   a starter switch;
   a clutch for transmitting an output of an engine;
   a clutch control unit for controlling engagement of said clutch;
   a transmission;
   a first detector for detecting an rpm of said engine;
   a second detector for detecting an output rpm of said clutch;
   a gear position detector for detecting a gear position of said transmission;
   a control unit for controlling said clutch control unit based on outputs of said respective detectors and enables said starter switch to operate when said transmission is in a neutral position;
   said control unit including a starter switch detector for determining whether said starter switch is on and a fault determination unit for determining whether said first detector is faulty;
   said fault determination unit controls said clutch control unit to engage said clutch temporarily if there is no output from said first detector with said starter switch on and determines that said first detector is faulty if there is an output from said second detector.

2. The automatic transmission of claim 1, wherein said first and second detectors include an engine rpm sensor for detecting an output shaft rpm of said engine and an input shaft rpm of said transmission, respectively.

3. The automatic transmission of claim 2, wherein said fault determination unit controls said clutch control unit to engage said clutch temporarily if there is no output from said engine rpm sensor with said starter switch on and determines whether there is an output from said input shaft sensor, and, if there is one, determines whether said output falls within a predetermined range, and, if it does, determines that only said engine rpm sensor is faulty, and, if it does not, determines that both of said engine rpm sensor and said input shaft sensor can be faulty, and, if there is no output from said input shaft sensor, determines that either a starter system or a battery is faulty.

4. An automatic transmission with a sensor fault detector, comprising:
   a starter switch;
   a clutch for transmitting an output of an engine;
   a clutch control unit for controlling engagement of said clutch;
   a transmission;
   a first detector for detecting an rpm of said engine;
   a second detector for detecting an output rpm of said clutch;
   a gear position detector for detecting a gear position of said transmission;
   a control unit for controlling said clutch control unit based on outputs of said respective detectors and enables said starter switch to operate when said transmission is in a neutral position;
   said control unit including a starter switch detector for determining whether said starter switch is on and a fault determination unit for determining whether said first detector is faulty;
   said fault determination unit controls said clutch control unit to engage said clutch in advance and determines that said first detector is faulty if there is no output from said first detector but an output from said second detector when said starter switch is on.

5. The automatic transmission of claim 4, wherein said first and second detectors include an engine rpm sensor for detecting an output shaft rpm of said engine and an input shaft rpm of said transmission, respectively.

6. The automatic transmission of claim 5, wherein said fault determination unit controls said clutch control unit to engage said clutch in advance and determines whether there is an output from said engine rpm sensor with said starter switch on and, if there is none, determines whether there is an output from said input shaft sensor, and, if there is none, determines that either a starter system including a battery or both of said engine rpm sensor and said input shaft sensor are faulty and, if there is an output from said input shaft sensor, determines that only said engine rpm sensor is faulty, and, if there is an output from said engine rpm sensor, determines whether there is an output from said input shaft sensor and, if there is none, determines that said input shaft sensor is faulty and, if there is one, determines that all are in good order.

7. A clutch control system with a sensor fault detector, comprising:
   a clutch;
   a clutch control unit for controlling engagement of said clutch;
   a first detector for detecting an rpm of an engine;
   a second detector for detecting an output rpm of said clutch;
   a vehicle condition detector for detecting a condition of a vehicle;
   a clutch learning unit for moving said clutch toward engagement from a predetermined learning starting point by means of said clutch control unit when said vehicle condition detector indicates that said vehicle is in a predetermined state, determines a clutch position where an output of said clutch reaches a predetermined rpm, and controls said clutch control unit based on said clutch position;

a learning determination unit for determining whether said clutch learning unit is in a learning activity and a fault determination unit for determining that said first detector is faulty if there is no output from said first detector but an output from second detector when said clutch learning unit is in a learning activity or when a vehicle starts to move.

8. The clutch control system of claim 7, wherein said fault determination unit performs faulty determination during a learning activity and, if said fault determination is not completed in a period of said learning activity, performs fault determination at a vehicle starting time.

* * * * *